United States Patent
De Haan et al.

(10) Patent No.: US 8,586,265 B2
(45) Date of Patent: Nov. 19, 2013

(54) METHOD OF FORMING MEMBRANE ELECTRODE ASSEMBLIES FOR ELECTROCHEMICAL DEVICES

(75) Inventors: David S. De Haan, Burnaby (CA); Ben Tham, Coquitlam (CA); Liviu Catoiu, New Westminister (CA)

(73) Assignee: Daimler AG, Stuttgart (DE)

( * ) Notice: Subject to any disclaimer, the term of this patent is extended or adjusted under 35 U.S.C. 154(b) by 1561 days.

(21) Appl. No.: 11/700,407

(22) Filed: Jan. 30, 2007

(65) Prior Publication Data

US 2008/0182150 A1 Jul. 31, 2008

Related U.S. Application Data

(60) Provisional application No. 60/872,428, filed on Jan. 31, 2006.

(51) Int. Cl.
H01M 8/00 (2006.01)
H01M 8/10 (2006.01)

(52) U.S. Cl.
USPC ............ 429/535; 429/483; 429/481; 429/482

(58) Field of Classification Search
USPC .................................. 429/535, 483, 482, 481
See application file for complete search history.

(56) References Cited

U.S. PATENT DOCUMENTS

| | | | | |
|---|---|---|---|---|
| 5,330,860 A * | 7/1994 | Grot et al. | ......................... | 429/42 |
| 6,524,736 B1 | 2/2003 | Sompalli et al. | ................ | 429/42 |
| 6,713,424 B2 | 3/2004 | Stumper et al. | ............... | 502/101 |
| 6,716,551 B2 | 4/2004 | Peinecke et al. | ................ | 429/39 |
| 6,844,286 B2 | 1/2005 | Kohler et al. | ................ | 502/101 |
| 6,977,234 B2 | 12/2005 | Kosako et al. | ................ | 502/101 |
| 6,998,149 B2 * | 2/2006 | Kohler et al. | ................ | 427/115 |
| 2002/0064593 A1 | 5/2002 | Kohler et al. | | |
| 2002/0071980 A1 | 6/2002 | Tabata et al. | | |
| 2002/0192383 A1 | 12/2002 | Lo et al. | ......................... | 427/359 |
| 2002/0192548 A1 | 12/2002 | Schaefer et al. | ............... | 429/209 |
| 2004/0209138 A1 | 10/2004 | Ueyama et al. | ................ | 429/30 |
| 2006/0040045 A1 | 2/2006 | Limmer et al. | ............... | 427/115 |
| 2009/0053583 A1 | 2/2009 | Binder et al. | | |

FOREIGN PATENT DOCUMENTS

| | | |
|---|---|---|
| EP | 1489677 A2 | 12/2004 |
| JP | 07176317 A | 7/1995 |
| JP | 2001038157 | 2/2001 |
| JP | 2002063909 | 2/2002 |
| JP | 2004241362 | 8/2004 |
| WO | WO 02/089237 | 11/2002 |

OTHER PUBLICATIONS

Mehta, V. et al., Review and analysis of PEM fuel cell design and manufacturing, Journal of Power Sources, 2003, pp. 32-53, vol. 114, No. 1, Elsevier, Amsterdam, The Netherlands.

* cited by examiner

*Primary Examiner* — Helen O Conley
(74) *Attorney, Agent, or Firm* — Crowell & Moring LLP

(57) ABSTRACT

A method of forming a membrane electrode assembly (MEA) includes first bonding a first electrode layer to a first side of an ion-exchange membrane. The method may further include protecting a second side of the membrane with a release sheet. The method may further include removing the release sheet and bonding the second side of the membrane to a first side of a second electrode layer. The method may further include positioning venting members on a second side of the second electrode layer to remove at least one of a liquid and a vapor that may be generated during the bonding process. In another embodiment an electrocatalyst can first bond to at least one side of the membrane, and subsequently, to a gas diffusion layer. An opposing side of the membrane can bond to an electrode layer in aqueous state.

6 Claims, 7 Drawing Sheets

US 8,586,265 B2

METHOD OF FORMING MEMBRANE ELECTRODE ASSEMBLIES FOR ELECTROCHEMICAL DEVICES

CROSS-REFERENCE TO RELATED APPLICATION

This application claims the benefit under 35 U.S.C. §119(e) of U.S. Provisional Patent Application Ser. No. 60/872,428 filed Jan. 31, 2006 (formerly U.S. application Ser. No. 11/343,746, converted to provisional by petition filed Jan. 17, 2007), which application is incorporated herein by reference in its entirety.

BACKGROUND OF THE INVENTION

1. Field of the Invention

The present invention is generally directed toward improved methods for making gas diffusion electrodes for electrochemical devices, and more particularly, to methods of achieving a smoother surface of the gas diffusion electrodes at an ion-exchange membrane interface.

2. Description of the Related Art

Electrochemical cells comprising ion exchange membranes, such as proton exchange membranes (PEMs), for example, polymer electrolyte membranes may be operated as fuel cells, wherein a fuel and an oxidant are electrochemically converted at the cell electrodes to produce electrical power, or as electrolyzers, wherein an external electrical current is passed between the cell electrodes, typically through water, resulting in generation of hydrogen and oxygen at the respective electrodes. FIGS. 1-4 collectively illustrate a typical design of a conventional membrane electrode assembly 5, an electrochemical cell 10 comprising a PEM layer 2, and a stack 50 of such cells.

Each cell 10 comprises a membrane electrode assembly ("MEA") 5 such as that illustrated in an exploded view in FIG. 1. The MEA 5 comprises an ion exchange membrane 2 interposed between first and second electrode layers 1, 3, which are typically porous and electrically conductive. As illustrated in FIG. 5, the electrode layers 1, 3 typically comprise a gas diffusion layer 20, 22 and an electrocatalyst 21, 23 positioned at an interface with the ion-exchange membrane 2 for promoting the desired electrochemical reaction.

In an individual cell 10, illustrated in an exploded view in FIG. 2, an MEA 5 is interposed between first and second cell separator plates 11, 12, which are typically fluid impermeable and electrically conductive. The cell separator plates 11, 12 are manufactured from non-metals, such as graphite; from metals, such as certain grades of steel or surface treated metals; or from electrically conductive plastic composite materials.

Electrochemical cells 10 with ion exchange membranes 2 are advantageously stacked to form a stack 50 (see FIG. 4) comprising a plurality of cells disposed between first and second end plates 17, 18. A compression mechanism is typically employed to hold the cells 10 tightly together, to maintain good electrical contact between components, and to compress the seals. In the embodiment illustrated in FIG. 3, each cell 10 comprises a pair of cell separator plates 11, 12 in a configuration with two cell separator plates per MEA 5. Cooling spaces or layers may be provided between some or all of the adjacent pairs of cell separator plates 11, 12 in the stack 50. An alternate configuration (not shown) has a single separator plate, or "bipolar plate," interposed between a pair of MEAs 5 contacting the cathode of one cell and the anode of the adjacent cell, thus resulting in only one separator plate per MEA 5 in the stack 50 (except for the end cell). Such a stack 50 may comprise a cooling layer interposed between every few cells 10 of the stack, rather than between each adjacent pair of cells.

The illustrated cell elements have openings 30 formed therein which, in the stacked assembly, align to form gas manifolds for supply and exhaust of reactants and products, respectively, and, if cooling spaces are provided, for a cooling medium.

The gas diffusion layers 20, 22 of the respective electrode layers 1, 3, illustrated in FIG. 5, comprise a substrate with a porous structure, which renders it permeable to fluid reactants and products in the fuel cell.

Fluid reactants may be supplied to the electrode layers 1, 3 in either gaseous or liquid form. In electrochemical fuel cells employing hydrogen as the fuel and oxygen as the oxidant, the catalyzed reaction at the anode produces hydrogen cations (protons) and electrons from the fuel. The gaseous reactants move across and through the gas diffusion layer 20 to react at the electrocatalyst 21. The ion-exchange membrane 2 facilitates the migration of protons from the anode 1 to the cathode 3 while electrons travel from the anode 1 to the cathode 3 by an external load. At the electrocatalyst layer 23 of the cathode 3, oxygen reacts with the protons that have crossed the membrane 2 and the electrons to form water as the reaction product.

The electrocatalysts 21, 23 are typically disposed in a layer at each interface between the membrane 2 and the gas diffusion layers 20, 22, to induce the desired electrochemical reaction in the MEA 5. The electrocatalysts 21, 23 may be a metal black, an alloy or a supported catalyst, for example, platinum on carbon. The catalyst layers 21, 23 typically contain an ionomer, which may be similar to that used for the ion-exchange membrane (for example, up to 30% by weight NAFION® brand perfluorosulfonic-based ionomer). The catalyst layers 21, 23 may also contain various binders, such as polytetrafluoroethylene (PTFE). The electrocatalysts 21, 23 may be disposed as a layer on the gas diffusion layers 20, 22 to form the electrode layers 1, 3 or disposed as a layer on the ion-exchange membrane 2.

Materials commonly used as gas diffusion layers 20, 22 or as starting materials to form gas diffusion layers 20, 22 include carbon fiber paper, woven and nonwoven carbon fabrics, metal mesh or gauze, and other woven and nonwoven materials. Such materials are commercially available in flat sheets and, when the material is sufficiently flexible, in rolls. Gas diffusion layers 20, 22 tend to be highly electrically conductive and macroporous and may also contain a particulate electrically conductive material and a binder. The substrate may be pre-treated with a water-repellent material, for example, a fluororesin such as polytetrafluoroethylene, or with a mixture of a water repellent material and an electrically conductive material, such as a fluororesin and carbon black, to enhance water repellency. The gas diffusion layers 20, 22 may also comprise a sub-layer (typically comprising an electrically conductive material, such as carbon and graphite, and/or a water-repellent material, such as a fluororesin, or a mixture thereof coated on one side thereon in order to reduce porosity, provide a surface for electrocatalysts 21, 23, reduce surface roughness or achieve some other objective. The sub-layer can be applied by any of the numerous coating, impregnating, filling or other techniques known in the art. For example, the sub-layer may be in the form of an ink or paste that is applied to the substrate and may at least partially penetrate into the substrate.

In preparing the electrode layers 1, 3, it has been found desirable to reduce the surface roughness. Reduced surface roughness allows the electrode layers 1, 3 to sustain an improved bond with thin ion-exchange membranes 2. Peaks in the surface of one or both electrode layers 1, 3 may lead to perforations or leaks in ion-exchange membranes 2 when assembled into an MEA 5. The electrode layers 1, 3 may cause perforations or leaks by penetrating the ion-exchange membrane 2 or by reducing the thickness of the ion-exchange membrane 2. Pores or depressions in the surface of the electrode layers 1, 3 may also cause leaks, for example, as compressive stresses cause the membrane 2 to flow into pores and other surface depressions when the MEA 5 is heated, such as during bonding and fuel cell operation.

Accordingly, a smoother surface of the electrode layers 1, 3, reduces the quantity and severity of cracks in the electrode layers 1, 3, and in the ion-exchange membrane 2, preventing adverse fluid leaks that may result in fuel waste, corrosion, or mass transport losses. Examples of such cracks are shown in the optical images 24 of FIGS. 6-9. FIG. 10, which is a scanning electron micrograph 26 of a cross-section view of the electrode of FIG. 7, further reveals the inconsistencies and incontiguities in existing electrode layers 1, 3.

Various methods of assembling MEAs 5 have been proposed to reduce the surface roughness of the electrode layers 1, 3 at the ion-exchange membrane 2 interface. These methods typically include controlling the thickness of the electrocatalyst as described in U.S. Publication No. 2004/0209138, using roller compaction as elicited in U.S. Publication No. 2002/0192383, using heated rollers as explained in Japanese Publication No. 2001-038157, and compacting of multi-layered catalyst layers as provided in International Publication No. WO 02/089237. A further proposed method of producing MEAs 5 includes drying the catalyst ink during compaction. Yet other proposed methods include electrostatically charging the electrocatalysts 21, 23 prior to application onto the ion-exchange membrane 2 or to the gas diffusion layers 20, 22 of the electrode layers 1, 3.

Although the above-described methods have introduced limited reduction of surface roughness of the electrode layers 1, 3 at the ion-exchange membrane 2 interface, obstacles persist. For example, surface roughness continues to present difficulties in bonding the membrane 2 to the electrode layers 1, 3. Additionally, cracks, similar to those in FIGS. 6-9, continue to emerge, resulting in inefficient fluid diffusion, fuel waste, mass transport losses and corrosion of the MEA 5 components. Furthermore, processes such as hot compaction are expensive and time-consuming. Other methods such as Teflon-based electrocatalysts for electrode layers 1, 3, such as cathodes, have resulted in mass transport losses.

There remains a need for improved methods, which are less time-consuming and relatively inexpensive, to reduce surface roughness of electrode layers in electrochemical cells, achieve a better bond with thin membranes and prevent the onset of cracks.

BRIEF SUMMARY OF THE INVENTION

In one embodiment, a method of forming a membrane electrode assembly (MEA) having an ion-exchange membrane interposed between first and second electrode layers includes bonding a first side of the first electrode layer including a first electrocatalyst layer and a first gas diffusion layer, to a first side of the membrane, to substantially support the membrane and form a partial MEA. The method may further include bonding the partial MEA to the second electrode layer including a second electrocatalyst and a second gas diffusion layer, to achieve substantial contiguity between a second side of the membrane and a first side of the second electrode layer.

In yet another embodiment, the present invention provides an electrochemical device comprising a plurality of membrane electrode assemblies (MEAs), each MEA having an ion-exchange membrane interposed between first and second electrode layers having an electrocatalyst and a gas diffusion layer, each MEA formed by a method including bonding a first side of the first electrode layer to a first side of the membrane, forming a partial MEA, forming the second electrode layer, positioning a plurality of venting members on a first side of the gas diffusion layer of the second electrode layer, bonding the second side of the membrane to a first side of the electrocatalyst of the second electrode layer while the second electrode layer is aqueous, and removing the venting members upon substantial removal of the at least one of the liquid and the vapor.

BRIEF DESCRIPTION OF THE SEVERAL VIEWS OF THE DRAWING(S)

DETAILED DESCRIPTION OF THE INVENTION

Figure 1:
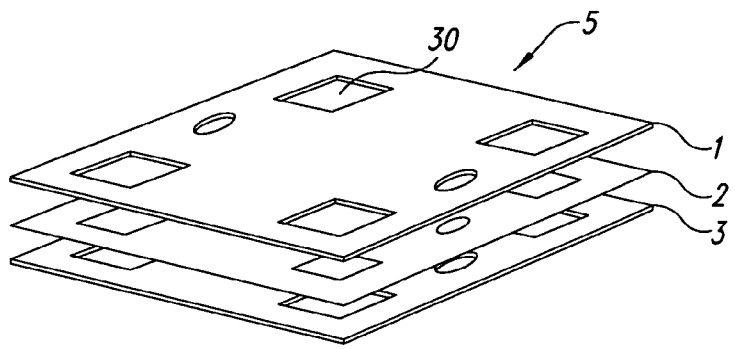
FIG. 1 is an exploded isometric view of a membrane electrode assembly according to the prior art.
Figure 2:
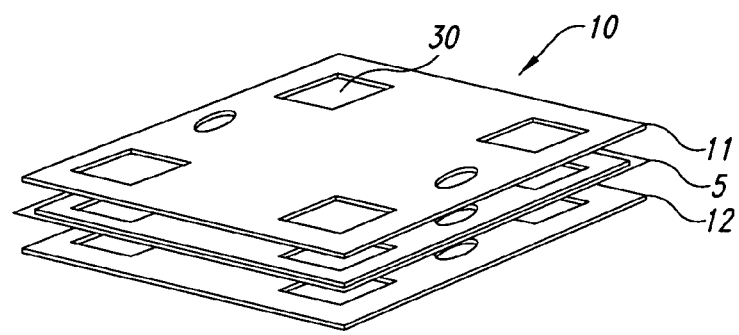
FIG. 2 is an exploded isometric view of an electrochemical cell according to the prior art.
Figure 3:
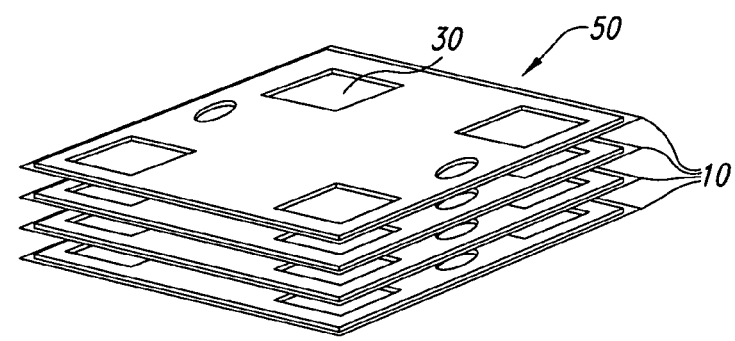
FIG. 3 is an exploded isometric view of an electrochemical cell stack according to the prior art.
Figure 4:
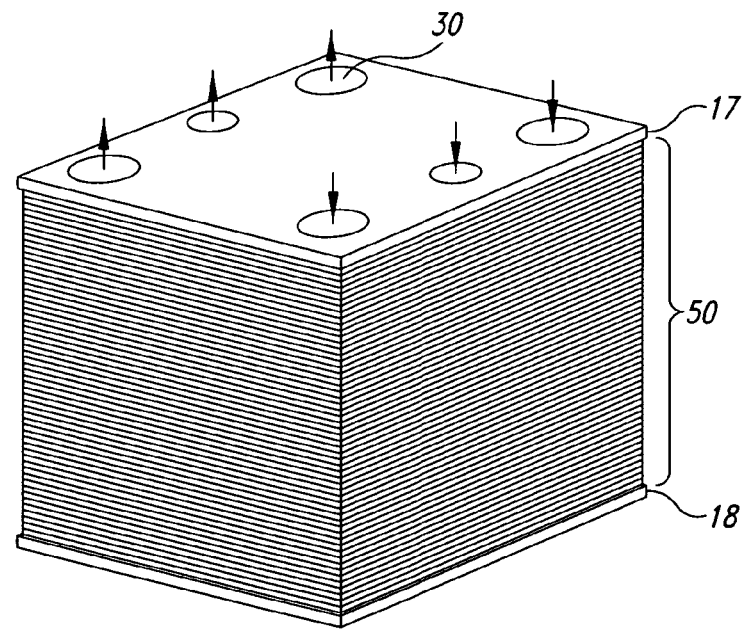
FIG. 4 is an isometric view of an electrochemical cell stack according to the prior art.
Figure 5:
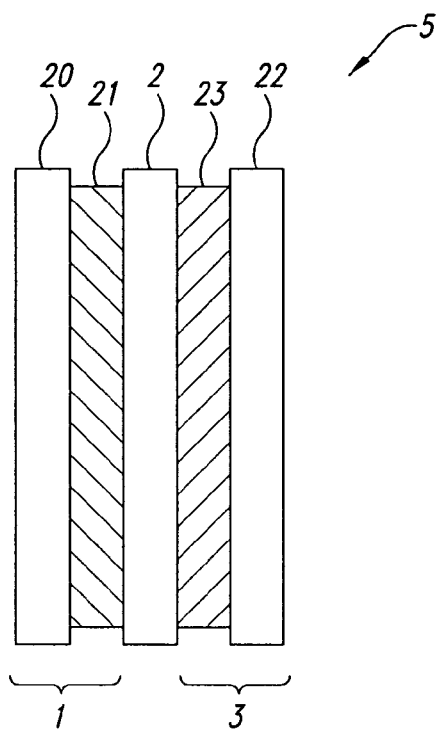
FIG. 5 is a cross-sectional view of a membrane electrode assembly according to the prior art.
Figure 6:
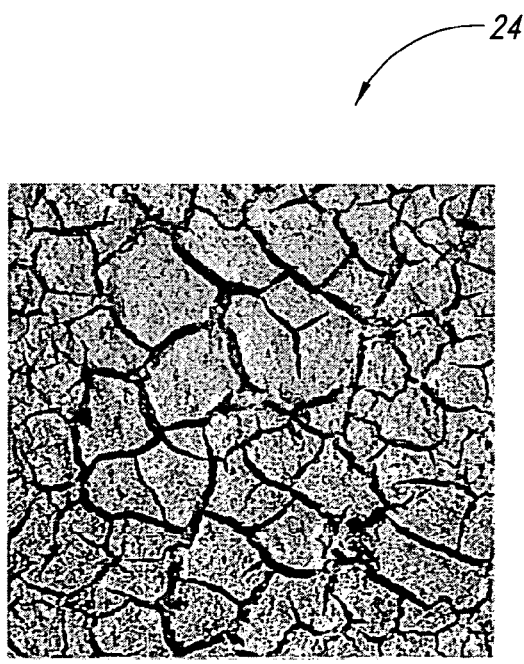
FIGS. 6-9 are optical images of gas diffusion electrode layers manufactured by prior art methods.
Figure 7:
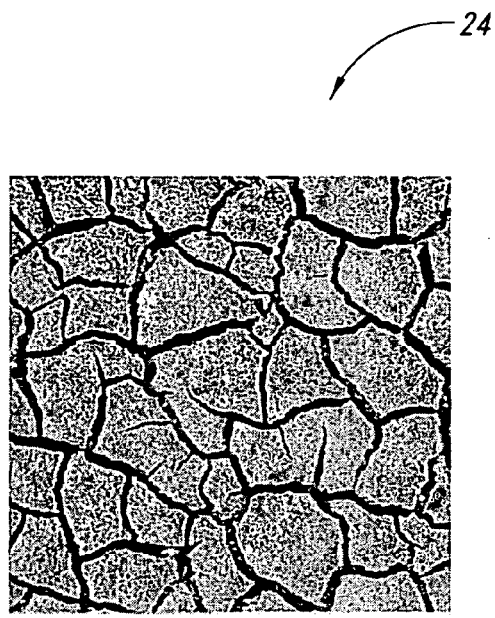
Figure 8:
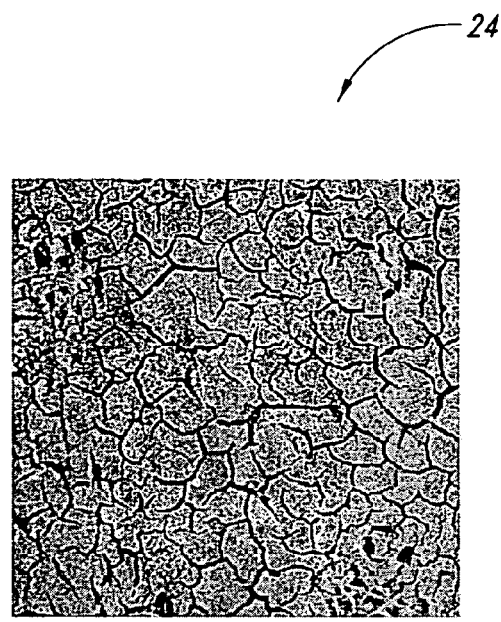
Figure 9:
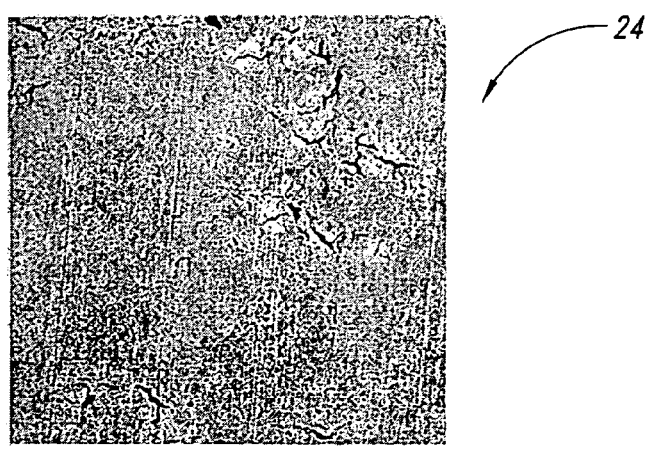
Figure 10:
FIG. 10 is a scanning electron micrograph of a cross-section view of the electrode of FIG. 7.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electrochemical systems and/or cells and/or fabrication of such cells such as, but not limited to, flow field plates, end plates, external circuits, reciprocal press bonding and/or double belt bonding have not been shown or described in detail to avoid unnecessarily obscuring descriptions of the embodiments.

Reference throughout this specification to "electrochemical systems", "fuel cells", "cell stack", "stack", and/or "electrolyzers" is not intended in a limiting sense, but is rather intended to refer to any device, apparatus, or system wherein a fuel and an oxidant are electrochemically converted to produce electrical power, or an external electrical current is passed between cell electrode layers, typically through water, resulting in generation of hydrogen and oxygen at the respective electrode layers.

Reference throughout this specification to "fuel" and/or "hydrogen" is not intended in a limiting sense, but is rather intended to refer to any reactant or gas separable into protons and electrons in a given chemical reaction to support electrochemical conversion to produce electrical power.

Reference throughout this specification to "oxidant" and/or "oxygen" is not intended in a limiting sense, but is rather intended to refer to any liquid or gas capable of oxidizing such as, but not limited to, oxygen, water, water vapor, or air.

Reference throughout this specification to "ion exchange membrane", "proton exchange membrane", "polymer electrolyte membrane" and/or "PEM" is not intended in a limiting sense, but is rather intended to refer to any membrane, structure or material capable of allowing ions of a first charge or polarity to pass across the membrane in a first direction while blocking the passage in the first direction of ions of a second charge or polarity, opposite to the first charge or polarity.

Reference throughout this specification to "anodes", "cathodes", "electrodes", "gas diffusion electrodes", "gas diffusion layers" and/or "electrode layers" is not intended in a limiting sense, but is rather intended to refer to any device, apparatus, layer or member that is electrically conductive, permeable to at least one of a gas and a liquid, and/or is capable of transferring protons and/or electrons.

Reference throughout this specification to "polytetrafluoroethylene", and/or "PTFE", and/or "TEFLON®" is not intended in a limiting sense, but is rather intended to refer to any material, component, layer and/or member that comprises nonstick qualities and/or is capable of temporally protecting a surface while being easily removable.

Reference throughout the specification to "venting" or "vapor transmitting" is not intended in a limiting sense, but is rather intended to refer to any material, component, layer and/or member that allows the removal of a liquid and/or vapor.

Figure 11:
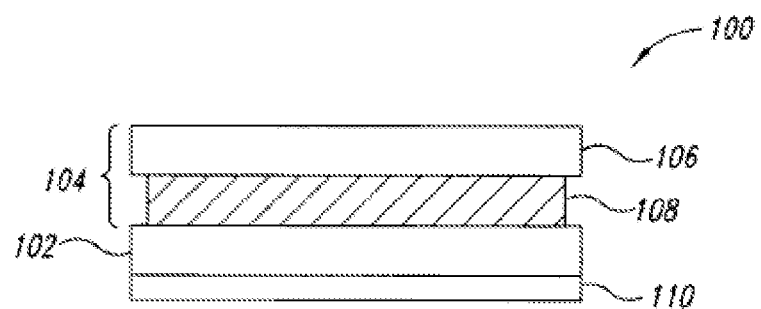
FIG. 11 is a top view of a partial MEA formed according to an embodiment of the present invention.

In one embodiment as illustrated in FIG. 11, a method of forming a membrane electrode assembly (MEA) includes first forming a partial MEA 100 using a wet-bonding approach, in which a first side of an ion-exchange membrane 102 is bonded to a first side of a first electrode layer 104 such as an anode, which in turn includes a gas diffusion layer 106 and an electrocatalyst 108. The electrocatalyst 108 may be interposed at the interface of the first electrode layer 104 and the ion-exchange membrane 102. To protect a second side of the ion-exchange membrane 102, a release sheet 110 such as polytetrafluoroethylene, commonly known by the brand name TEFLON®, can be positioned on the second side of the ion-exchange membrane 102. The release sheet 110 can be fabricated from a homopolymer TEFLON® sheet.

Figure 12:
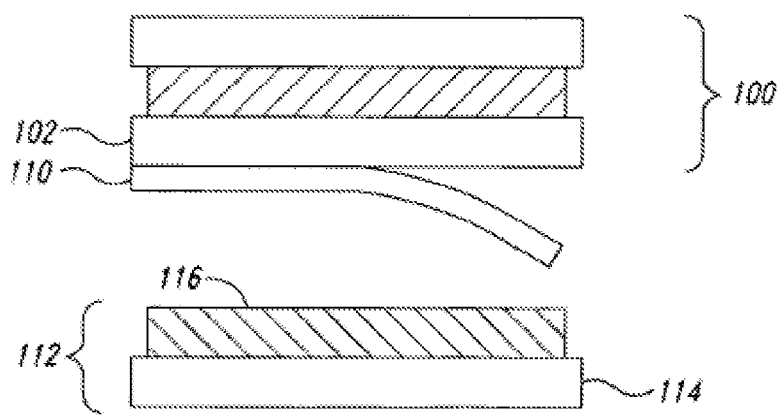
FIG. 12 is a top view of the partial MEA of FIG. 11 and an electrode layer according to an embodiment of the present invention.

The method further includes bonding the partial MEA 100 to a second electrode layer 112 such as a cathode, illustrated in FIG. 12. The second electrode layer 112 includes a gas diffusion layer 114 and an electrocatalyst 116. As illustrated in FIG. 12, the release sheet 110 is removed prior to bonding the partial MEA 100 to the second electrode layer 112. Since the release sheet 110 is fabricated from a nonstick material such as TEFLON®, it may easily be removed without damaging the second side of the ion-exchange membrane 102.

Figure 13:
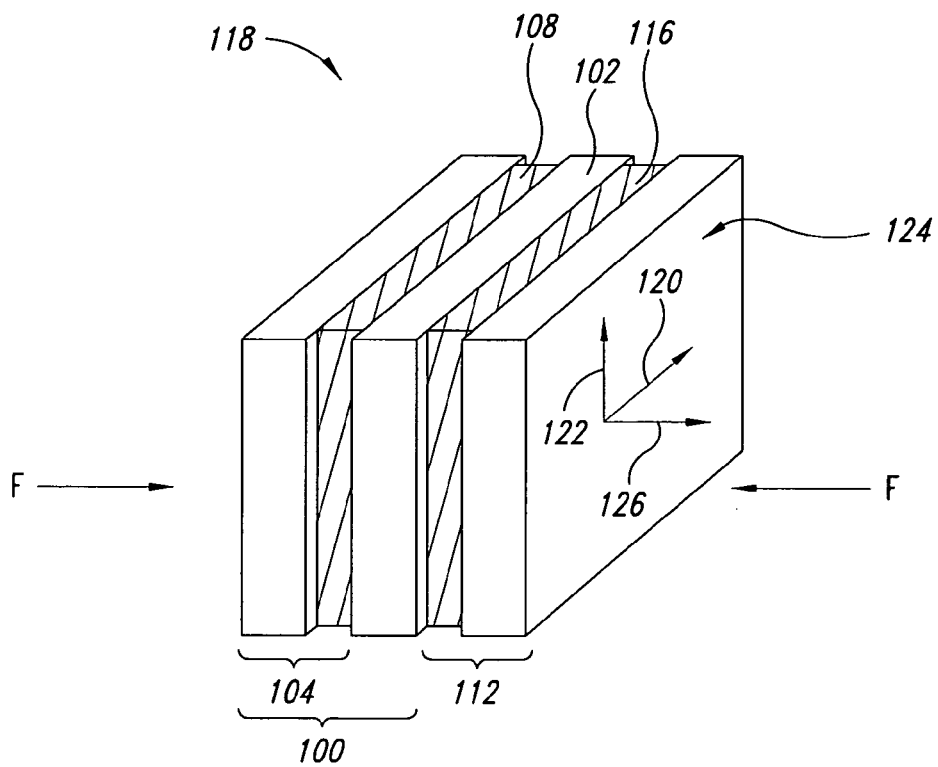
FIG. 13 is an isometric view of an MEA formed according to an embodiment of the present invention.

In the latter bonding process, the second side of the ion-exchange membrane 102 is bonded to a first side of the second electrode layer 112, which typically coincides with an exposed side of the electrocatalyst 116. Bonding preferably takes place under a compressive force F and at an elevated temperature for a period of time, to form an MEA 118, illustrated in FIG. 13. Since the second electrode layer 112 experiences the bonding temperature while being compressed against the partial MEA 100, the second electrode layer 112, such as the cathode, remains substantially free of cracks, defects and/or peaks that can lead to cracks in the electrocatalyst 116 and/or the ion-exchange membrane 102. Bonding temperatures typically range from about 120° C. to about 300° C. and bonding pressures are typically greater than about atmospheric pressure and less than about 40 bar. Bonding times may vary from about 0.1 second (for example, instantaneously) to about 10 minutes.

The electrocatalysts 108, 116 typically include an ionomer such as NAFION®, which may be similar to that used for the ion-exchange membrane 102. An improved interface between the electrocatalysts 108, 116 and the ion-exchange membrane 102 may be observed if the ion-exchange material used in the electrocatalysts 108, 116 is the same as that used for the ion-exchange membrane 102; however, different materials may also be used. Additionally, or alternatively, the electrocatalysts 108, 116 may comprise other binders, for example, a fluororesin, such as PTFE.

In conventional MEAs, sources of potential defects during the bonding process include the shrinking of NAFION®, which prevents proper bonding of the electrocatalyst to the ion-exchange membrane. However, in an embodiment of the present invention, the compressive forces F during bonding prevent the NAFION® of the electrocatalyst 116 and/or of the ion-exchange membrane 102, or both, from shrinking or expanding along a first axis 120 and a second axis 122, which form a plane 124, parallel to a mating surface between the respective electrode layers 104, 112 and the ion-exchange membrane 102. The electrocatalyst 116 may be allowed to translate in a direction of a third axis 126, substantially perpendicular to the plane 124. Accordingly, the surface of the electrocatalyst 116 at the interface with the ion-exchange membrane 102 can substantially conform to the second side of the ion-exchange membrane 102 and result in a substantially smooth and contiguous mating surface.

In another embodiment of the present invention, to further induce the conformance of the electrocatalyst 116 of the second electrode layer 112 to the second side of the ion-exchange membrane 102, the second electrode layer 112, such as a cathode, can be in an aqueous state at the time the partial MEA 100 is bonded to the second electrode layer 112. In this process, when the bonding temperature is applied, steam may be generated, which may adversely affect the bonding process or result in corrosion and/or blistering of the components of the MEA 118.

Figure 14:
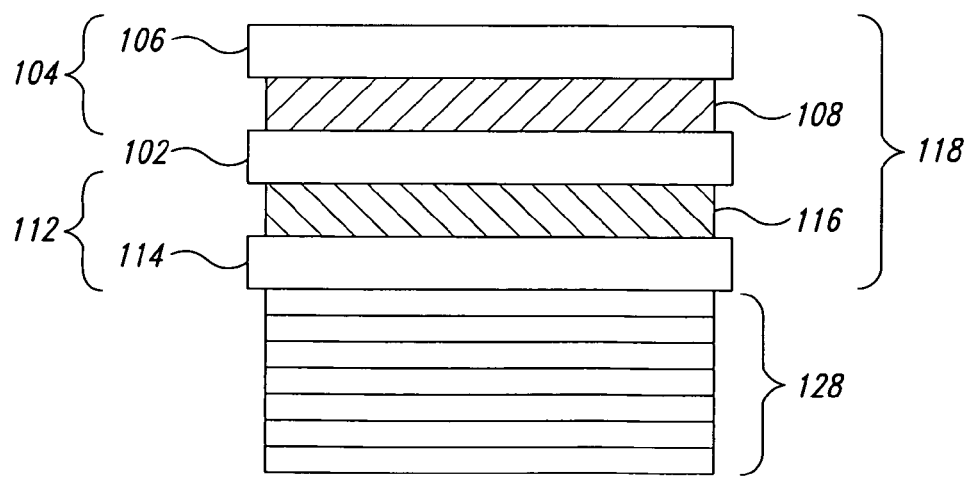
FIG. 14 is a top view of an MEA formed according to an embodiment of the present invention.

To remove vapor and/or liquid, such as steam and/or water, that may have been generated during the bonding process, an escape path such as a plurality of venting, or vapor transmitting, members 128, for example seven venting members 128 as illustrated in FIG. 14, may be provided on a second side of the second electrode layer 112 to allow the removal of any fluid that may remain in the MEA 118. Venting members 128 may include papers, filters, foams or any other material that allows the removal of fluids such as steam and/or water. In other embodiments, nylon fabrics such as PEELPLY can be used for the venting members 128.

The bonding of the first electrode layer 104 to the ion-exchange membrane 102 and also of the partial MEA 100 to the second electrode layer 112 can be facilitated by methods well-known in the art such as double belt bonding as described in detail by U.S. Patent Application No. 2002/0192548. Alternatively, a reciprocating press may be employed to compact the gas diffusion layers 106, 114 and the electrocatalysts 108, 116 of the first and second electrode layers 104, 112, respectively, and bond the electrode layers 104, 112 to the ion-exchange membrane 102 according to the assembly sequence described herein.

Figure 15:
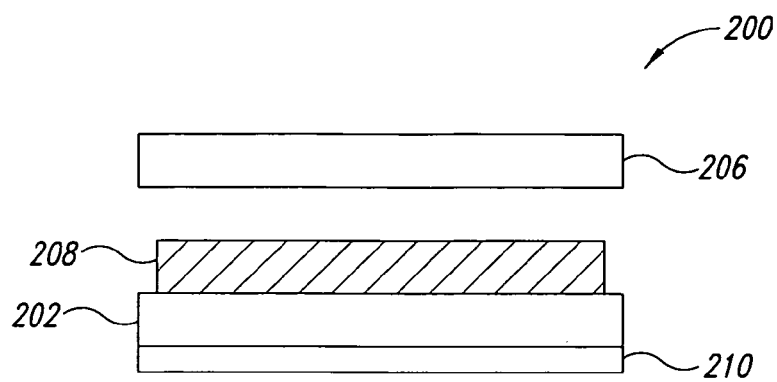
FIG. 15 is an exploded top view of a partial MEA formed according to another embodiment of the present invention.

In yet another embodiment as illustrated in FIG. 15, a method of forming an MEA 218 (FIG. 16) includes forming a partial MEA 200 by first bonding and/or applying an electrocatalyst 208 to a first side of an ion-exchange membrane such as an ion-exchange membrane 202. Similar to the embodiment above, a second side of the ion-exchange membrane 202 may be temporarily protected with a release sheet 210 such as a TEFLON® release sheet. Subsequently, an exposed side of the electrocatalyst 208 is bonded to a first gas diffusion layer 206 to form the partial MEA 200. The gas diffusion layer 206 and electrocatalyst 208 form a first electrode layer 204 (FIG. 16), such as an anode.

Figure 16:
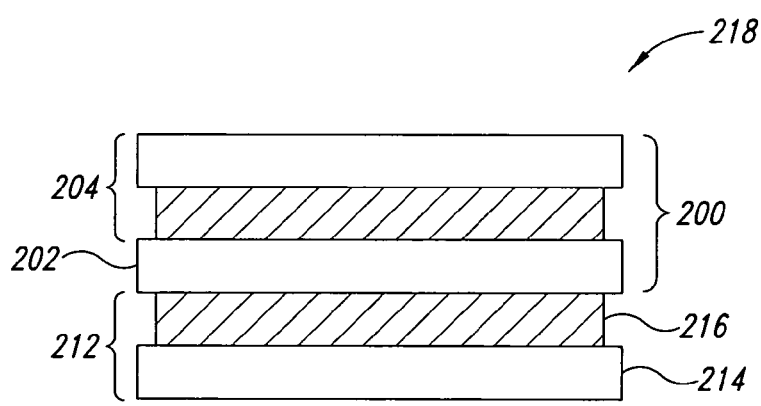
FIG. 16 is a top view of an MEA formed according to another embodiment of the present invention.

Furthermore, as illustrated in FIG. 16, the second side of the ion-exchange membrane 202, opposite the first gas diffusion layer 206, is bonded to a second electrode layer 212, such as a cathode, having a second gas diffusion layer 214 and a second electrocatalyst 216, to form the MEA 218. If a release sheet 210 is used, the release sheet 210 is peeled before bonding the ion-exchange membrane 202 to the second electrode layer 212. Bonding of the components of the MEA 218 can occur via application of a temperature and/or pressure as discussed in conjunction with the embodiment above. Furthermore, the second electrode layer 212 may be in aqueous form and applied onto the second side of the ion-exchange membrane 202 (i.e., an exposed side of the partial MEA 200).

Figure 17:
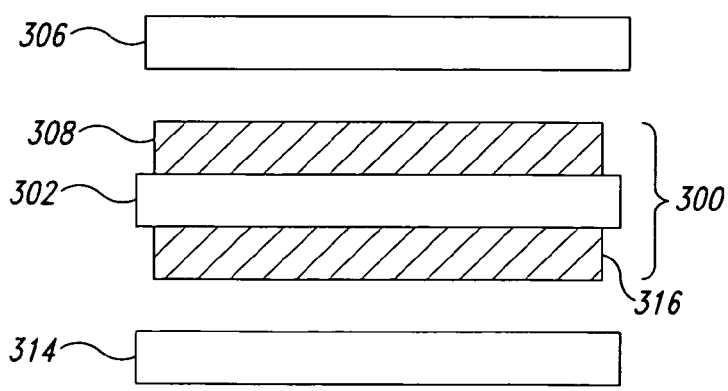
FIG. 17 is an exploded top view of an MEA formed according to another embodiment of the present invention.

In still another embodiment as illustrated in FIG. 17, a method of forming an MEA comprises bonding and/or applying first and second electrocatalysts 308, 316 to opposing first and second sides of an ion-exchange membrane 302 to form a partial MEA 300. The method further includes bonding opposing exposed sides of the partial MEA 300, which respectively coincide with exposed sides of the first and second electrocatalysts 308, 316, to opposing first and second gas diffusion layers 306, 314, to form the MEA.

In any of the embodiments herein, at least one adhesive layer may be applied between any two components of the MEA to promote bonding of the components. The at least one adhesive layer may contain polymeric, ionomeric, or conductive materials, or mixtures thereof, to promote adhesion between the components. The polymeric materials may be, for example, hydrophobic or hydrophilic, depending on the properties desired. In some cases, an ionomeric material may be desirable to provide the desired water transfer and/or proton transfer properties through the adhesive layer. These materials may be dissolved in a suitable liquid and applied to the appropriate surfaces, such as a surface of the gas diffusion layers, catalyst layers or ion-exchange membranes, prior to applying temperature for bonding these components. The at least one adhesive layer may be applied to the various MEA components by any method known in the art, such as spraying, coating, screen-printing, and decal-transfer.

EXAMPLE

Figure 18:
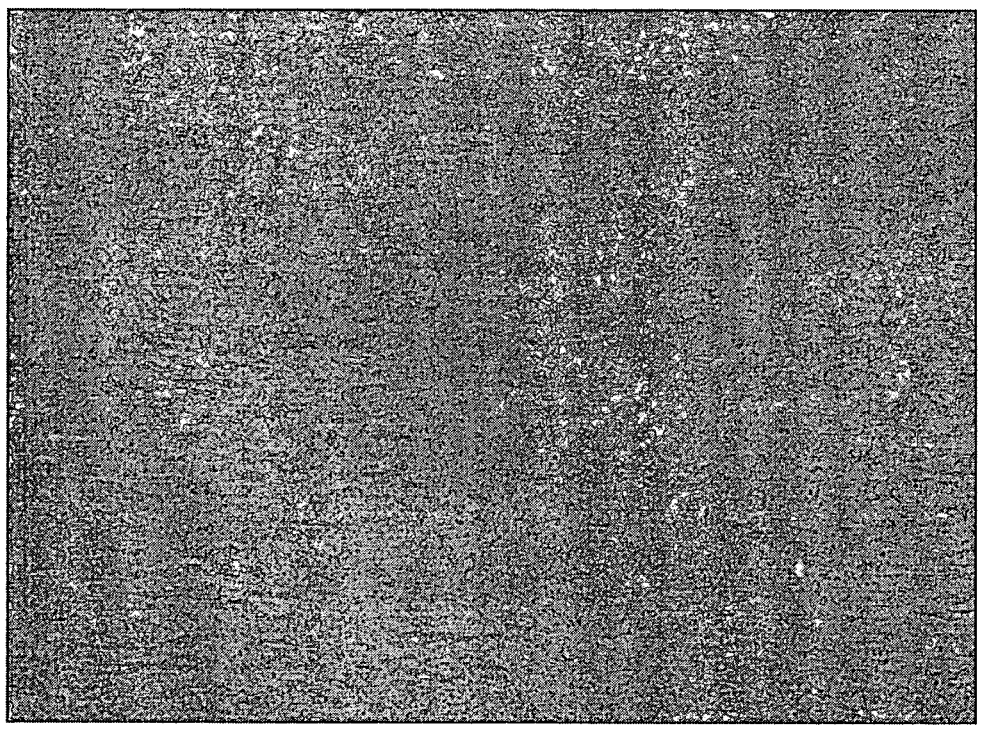
FIG. 18 is a scanning electron micrograph of a cross-section view of an electrode layer formed according to an embodiment of the present invention.

A partial MEA was prepared using Nafion® membranes supplied by DuPont and TGP-H-060 carbon fiber substrates supplied by Toray Industries, Inc. The carbon fiber substrates were first treated by dipping them into a solution of PTFE and then sintered. Each was then coated with a slurry of carbon particles and PTFE to form a sublayer on one surface of the substrate, and then sintered to form a gas diffusion layer. A cathode electrocatalyst layer comprising a Pt-based catalyst dispersed in Nafion® ionomer and deionized water was then coated on top of the sublayer to form a cathode electrode. The partial MEA was then prepared by placing the cathode electrode against a surface of the membrane such that the electrocatalyst layer was interposed between the membrane and the sublayer. A sheet of PTFE was placed against the opposing exposed surface of the membrane to protect the membrane during bonding. The assembly was then placed into a bonding press heated to about 150° C. and subjected to 15 bar bonding pressure for about 2.5 minutes in the heated bonding press to form a partial MEA. FIG. 18 is an optical image of a surface 130 of the cathode electrocatalyst layer 112 of the resulting partial MEA formed by the method described above. In contrast to the surfaces 24 of the electrocatalyst layer formed by existing methods and depicted in FIGS. 6-9, the surface 130 of the cathode electrocatalyst layer formed by the method described above exhibits a smooth and consistent structure, which is free of cracks.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and equivalents thereof.

The invention claimed is:

1. An electrochemical device comprising a plurality of membrane electrode assemblies (MEAs), each MEA having an ion-exchange membrane interposed between first and second electrode layers having an electrocatalyst and a gas diffusion layer, each MEA formed by a method comprising:
   disposing a release sheet on a second side of the membrane;
   bonding a first side of the first electrode layer to a first side of the membrane, forming a partial MEA;
   forming the second electrode layer;
   removing the release sheet from the second side of the membrane of the partial MEA;
   positioning a plurality of venting members on a first side of the gas diffusion layer of the second electrode layer;
   bonding using temperature and pressure, while the plurality of venting members remove at least one of liquid and vapor from a combination of the partial MEA and the second electrode layer, the second side of the membrane of the partial MEA to a first side of the electrocatalyst of the second electrode layer while the second electrode layer is aqueous, achieving substantial contiguity between a second side of the membrane of the partial MEA and the first side of the electrocatalyst; and removing the venting members upon substantial removal of the at least one of liquid and vapor from the combination of the partial MEA and second electrode layer.

2. The electrochemical device of claim 1, wherein the second electrode layer is formed by a method comprising:
providing a gas diffusion layer; and
applying an electrocatalyst ink comprising catalyst particles and a solvent to a second side of the gas diffusion layer.

3. An electrochemical device comprising a plurality of membrane electrode assemblies (MEAs), each MEA having an ion-exchange membrane interposed between first and second electrode layers having an electrocatalyst and a gas diffusion layer, each MEA formed by a method comprising:
disposing a release sheet on a second side of the membrane;
bonding a first side of the first electrode layer to a first side of the membrane, forming a partial MEA;
forming the second electrode layer;
removing the release sheet from the second side of the membrane of the partial MEA;
positioning a plurality of venting members on a first side of the gas diffusion layer of the second electrode layer;
bonding, using temperature and pressure, the second side of the membrane of the partial MEA to a first side of the electrocatalyst of the second electrode layer while the plurality of venting members are positioned on the first side of the gas diffusion layer of the second electrode layer and the second electrode layer is aqueous, achieving substantial contiguity between a second side of the membrane of the partial MEA and the first side of the electrocatalyst; and
removing, from a combination of the partial MEA and second electrode layer, the venting members upon substantial removal of at least one of a liquid and a vapor.

4. The electrochemical device of claim 3, wherein the second electrode layer is formed by a method comprising:
providing a gas diffusion layer; and
applying an electrocatalyst ink comprising catalyst particles and a solvent to a second side of the gas diffusion layer.

5. An method of forming a membrane electrode assembly (MEA), having an ion-exchange membrane interposed between first and second electrode layers having an electrocatalyst and a gas diffusion layer, the method comprising:
disposing a release sheet on a second side of the membrane;
bonding a first side of the first electrode layer to a first side of the membrane, forming a partial MEA;
forming the second electrode layer;
removing the release sheet from the second side of the membrane of the partial MEA;
positioning a plurality of venting members on a first side of the gas diffusion layer of the second electrode layer;
bonding, using temperature and pressure, the second side of the membrane of the partial MEA to a first side of the electrocatalyst of the second electrode layer while the plurality of venting members are positioned on the first side of the gas diffusion layer of the second electrode layer and the second electrode layer is aqueous, achieving substantial contiguity between a second side of the membrane of the partial MEA and the first side of the electrocatalyst; and
removing, from a combination of the partial MEA and second electrode layer, the venting members upon substantial removal of at least one of a liquid and a vapor.

6. The method of claims 4, wherein the second electrode layer is formed by:
providing a gas diffusion layer; and
applying an electrocatalyst ink comprising catalyst particles and a solvent to a second side of the gas diffusion layer.

* * * * *